United States Patent
Matsushita et al.

(10) Patent No.: US 9,663,066 B2
(45) Date of Patent: May 30, 2017

(54) REGISTRATION DEVICE

(71) Applicant: KABUSHIKI KAISHA TOKAI RIKA DENKI SEISAKUSHO, Aichi (JP)

(72) Inventors: Masahiro Matsushita, Aichi (JP); Shinichi Koga, Aichi (JP); Tomohiro Ito, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 143 days.

(21) Appl. No.: 14/088,848

(22) Filed: Nov. 25, 2013

(65) Prior Publication Data

US 2014/0145833 A1 May 29, 2014

(30) Foreign Application Priority Data

Nov. 29, 2012 (JP) ................ 2012-261055

(51) Int. Cl.
*B60R 25/24* (2013.01)
*B60R 1/12* (2006.01)

(52) U.S. Cl.
CPC ............ *B60R 25/24* (2013.01); *B60R 25/241* (2013.01); *B60R 2001/1284* (2013.01)

(58) Field of Classification Search
CPC ............ B60R 2001/1284; B60R 25/24; B60R 25/241
USPC ................... 340/10.51, 10.52, 5.72
See application file for complete search history.

(56) References Cited

U.S. PATENT DOCUMENTS

| | | | | |
|---|---|---|---|---|
| 6,388,558 | B1* | 5/2002 | Emmei | B60R 25/04 340/5.1 |
| 2002/0177472 | A1* | 11/2002 | Tomoda | H04M 1/6091 455/569.2 |
| 2003/0117846 | A1 | 6/2003 | Hasegawa et al. | |
| 2005/0132130 | A1 | 6/2005 | Hasegawa et al. | |
| 2005/0270138 | A1* | 12/2005 | Ikeda | B60R 25/24 340/5.23 |
| 2006/0186988 | A1* | 8/2006 | Proefke | B60R 25/24 340/5.61 |

(Continued)

FOREIGN PATENT DOCUMENTS

| | | |
|---|---|---|
| CN | 1414587 | 4/2003 |
| CN | 1522900 | 8/2004 |

(Continued)

OTHER PUBLICATIONS

Japan Office action, mail date is Oct. 28, 2014.

(Continued)

*Primary Examiner* — Thomas Alunkal (74) *Attorney, Agent, or Firm* — Greenblum & Bernstein, P.L.C.

(57) ABSTRACT

A registration device includes a processor that writes an ID code to an invalid ID code storage region in accordance with management data, updates the management data after the ID code is safely written, and validates the invalid ID code storage region storing the ID code. After the ID code is written, when an ID code is stored in every one of the ID code storage regions, the processor updates the management data to invalidate the ID code storage region excluding the invalid ID code storage region storing the ID code.

12 Claims, 6 Drawing Sheets

(56) References Cited

U.S. PATENT DOCUMENTS

| | | | | |
|---|---|---|---|---|
| 2009/0132117 A1* | 5/2009 | Kondoh | ................ | G06F 11/167 |
| | | | | 701/36 |
| 2009/0309696 A1* | 12/2009 | Tsuruta | .................. | B60R 25/04 |
| | | | | 340/5.22 |
| 2013/0054079 A1 | 2/2013 | Shibata et al. | | |

FOREIGN PATENT DOCUMENTS

| | | | | |
|---|---|---|---|---|
| CN | 202023428 | 11/2011 | | |
| CN | 102545915 | 7/2012 | | |
| EP | 0398545 | 11/1990 | | |
| EP | 0398545 A1 * | 11/1990 | ........... | G06Q 20/341 |
| GB | 2300741 | 11/1996 | | |
| JP | 2003-044344 | 2/2003 | | |
| JP | 2003-186758 | 7/2003 | | |
| JP | 2007-162309 | 6/2007 | | |
| JP | 2009-120054 | 6/2009 | | |
| JP | 2011-221900 | 11/2011 | | |
| JP | 2012-193571 | 10/2012 | | |

OTHER PUBLICATIONS

Australia Office action, mail date is Apr. 9, 2015.
China Office action for China Patent Application No. 201310617797.5, mail date is Sep. 25, 2015.

* cited by examiner

REGISTRATION DEVICE

CROSS-REFERENCE TO RELATED APPLICATIONS

This application is based upon and claims the benefit of priority from prior Japanese Patent Application No. 2012-261055, filed on Nov. 29, 2012, the entire contents of which are incorporated herein by reference.

BACKGROUND

The present invention relates to a registration device that registers an ID code.

A vehicle may be provided with an electronic key system that verifies an ID code transmitted from an electronic key. Japanese Laid-Open Patent Publication No. 2012-193571 describes an electronic key system that includes a main key and a registration device, which registers ID codes of sub-keys.

In the '571 publication, a maximum number of ID codes that can be registered is set for the electronic key system. To register a new ID code to the registration device when the maximum number of ID codes has already been registered, the new ID code is overwritten over an old registered ID code. When the overwriting of the new ID code is interrupted by, for example, a momentary power outage, the new ID code cannot be registered. In addition, the old ID code is deleted and erased.

It is an object of the present invention to provide a registration device that holds the correct ID code when an unexpected registration interruption occurs.

One aspect of the present invention is a registration device for registering ID codes. The registration device includes a storage unit set to allow for registration of a maximum of an n number of ID codes, where n is a natural number of two or greater. A registration control unit registers ID codes to the storage unit. The storage unit includes an n+1 number of ID code storage regions, each of which stores an ID code. A management data storage region stores management data indicating whether the ID code of each ID code storage region is valid or invalid. The registration control unit includes instructions configured to write an input ID code to an invalid ID code storage region among the n+1 number of ID code storage regions in accordance with the management data, update the management data after the input ID code is written to validate the invalid ID code storage region to which the input ID code has been written, and update the management data, when an ID code is stored in each of the n+1 number of ID code storage regions after the input ID code is written, to invalidate at least one ID code storage region excluding the invalid ID code storage region to which the input ID code has been written.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DESCRIPTION OF EMBODIMENTS

A first embodiment of a registration device for registering an ID code will now be described. In the illustrated example, the registration device is installed in a vehicle, which performs wireless communication with an electronic key, to register an ID code of the electronic key. The registration device and the electronic key may be referred to as an electronic key system.

Figure 1:
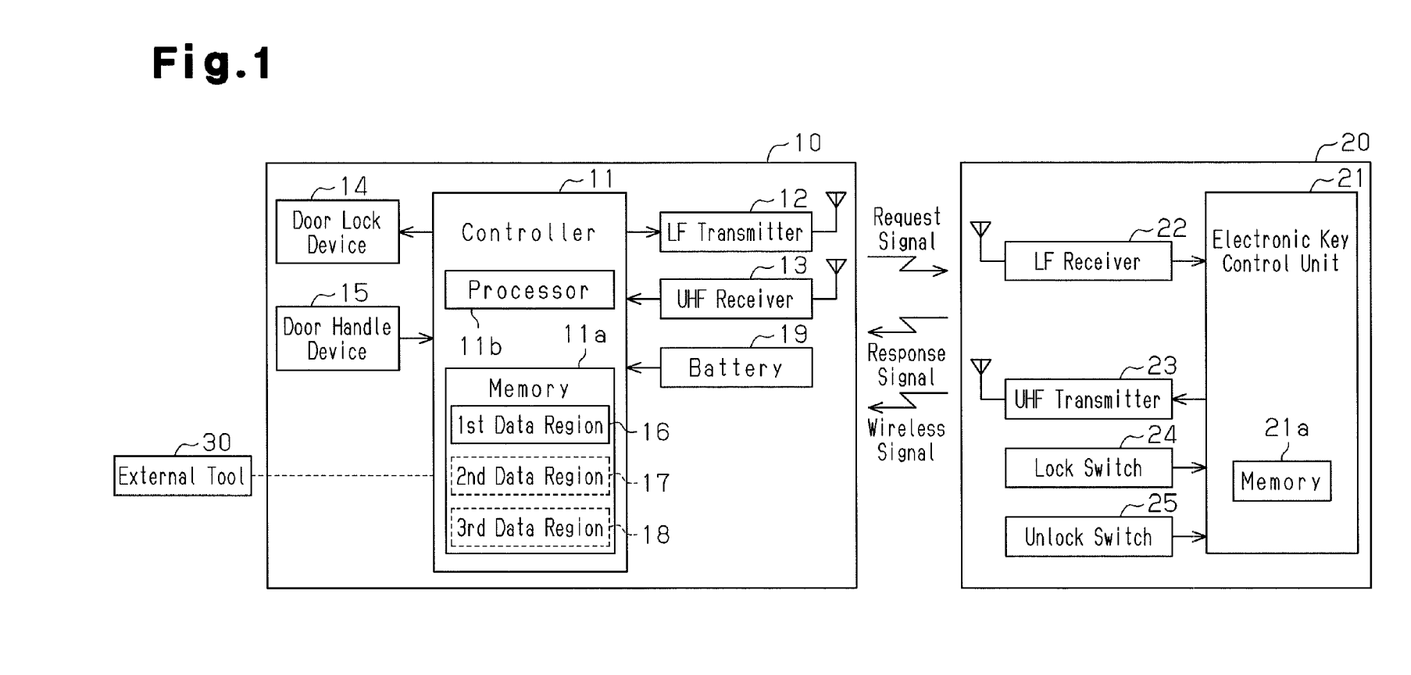
FIG. 1 is a block diagram of an electronic key system.

Referring to FIG. 1, a vehicle 10 is provided with an electronic key system including a controller 11, an LF transmitter 12, and a UHF receiver 13. The LF transmitter 12 transmits wireless signals on the low frequency (LF) band and is electrically connected to the controller 11. The UHF receiver 13 receives wireless signals on the ultrahigh frequency (UHF) band.

The controller 11 is electrically connected to a door lock device 14 and a door handle sensor 15. The door lock device 14 locks and unlocks a vehicle door. The door handle sensor 15 detects when a user touches the door handle and provides a touch signal to the controller 11. The vehicle 10 includes a battery 19. The battery 19 drives at least the controller 11.

As shown in FIG. 1, the controller 11 includes a memory 11a and a processor 11b. The memory 11a includes a first data region 16 that stores data used to verify an electronic key 20. The processor 11b includes computer-readable instructions to be executed by the processor 11b. The instructions may be stored in the memory 11a. In some embodiment, the instructions may be stored in a computer-readable storage device, such as a magnetic disk or optical disk, coupled to or accessed by the processor 11b.

Figure 2:
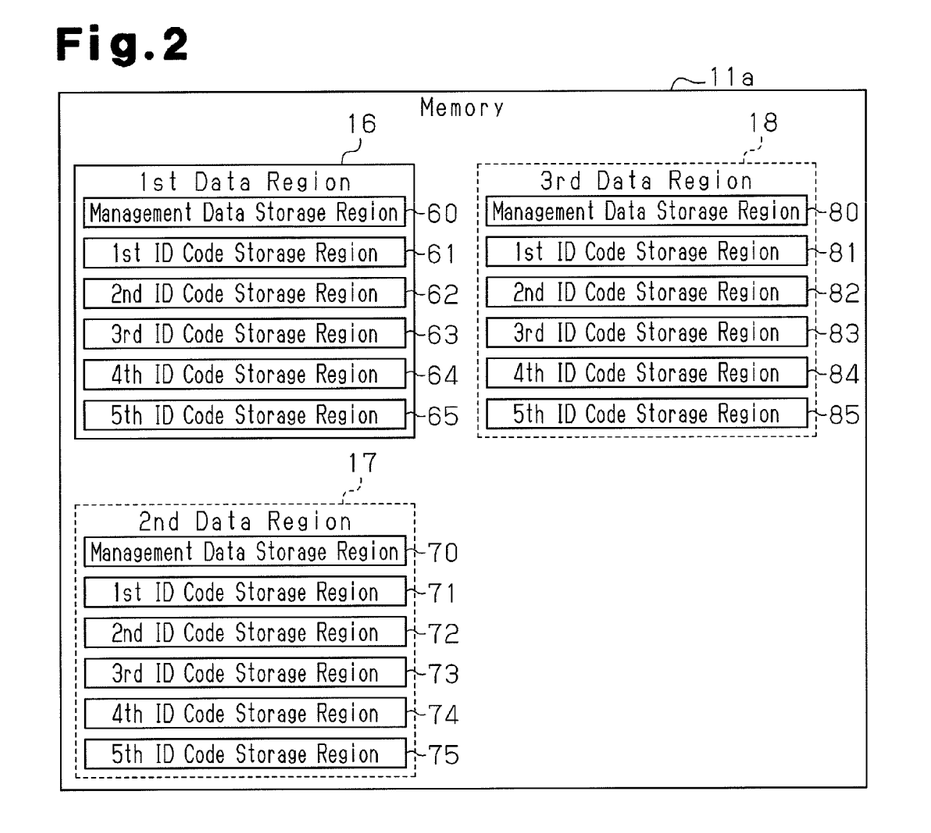
FIG. 2 is a block diagram of a memory.

As shown in FIG. 2, the first data region 16 includes first to fifth ID code storage regions 61, 62, 63, 64, and 65 and a management data storage region 60. The first to fifth ID code storage regions 61 to 65 may store ID codes of different electronic keys. An ID code is a binary bit string of several tens of bits. The management data storage region 60 stores management indicating whether the ID codes stored in the first to fifth ID code storage regions 61 to 65 are valid or invalid. The management data is, for example, a binary bit string including a number of bits (e.g., five bits) corresponding to the number of the ID code storage regions. Each bit is set to 1, which represents valid, or 0, which represents invalid. The management data storage region 60 is set to have a smaller storage capacity than each of the first to fifth ID code storage regions 61 to 65. In the illustrated example, the five bits of the management data correspond to the first to fifth ID code storage regions 61, 62, 63, 64, and 65 in order from the head bit. When the management data is 11100, the ID codes stored in the first to third ID code storage regions 61, 62, and 63 are valid, and the ID codes stored in the fourth and fifth ID code storage regions 64 and 65 are invalid. The processor 11b is configured to write a non-registered ID code to an invalid ID code storage region in accordance with a management bit. Each bit of the management data may be referred to as a management flag.

The registration of an ID code refers to a sequence for writing the ID code to a storage region and validating the storage region. When n represents the maximum number of ID codes that can be registered, n+1 represents the number of ID code storage regions. In the illustrated example, the processor 11b is allowed to write a maximum of five ID codes and validate a maximum of four ID codes.

The processor 11b and the memory 11a function to form a registration device. The processor 11b functions as a registration control unit. The memory 11a (first data region 16) may be referred to as a storage unit. The ID code storage regions 61 to 65 each function as an ID code storage region.

The controller 11 is operable in a communication mode, an ID code adding mode, an ID code rewriting mode, and a management data rewriting mode. In the communication mode, the controller 11 performs wireless communication with the electronic key 20. In the ID code adding mode, the processor 11b of the controller 11 writes a new ID code to the memory 11a and allows for an existing ID code and the new ID code to be used. In the ID code rewriting mode, the processor 11b of the controller 11 writes a new ID code to the memory 11a and allows for the new ID code to be used. In the management data rewriting mode, the processor 11b of the controller 11 rewrites only the management data and switches each ID code stored in the memory 11a to a usable state or a non-usable state.

As shown in FIG. 1, the controller 11 is connectable to an external tool 30. The external tool 30 provides the controller 11 with a mode switch signal, which switches the mode of the controller 11, and a rewrite signal, which rewrites the management data. The controller 11 is in the communication mode under normal situations. The mode switch signal from the external tool 30 switches the controller 11 to one of the ID code adding mode, the ID code rewriting mode, and the management data rewriting mode.

When the controller 11 is in the communication mode, the controller 11 performs wireless communication with the electronic key 20 through the LF transmitter 12 and the UHF receiver 13. The controller 11 transmits an ID request signal from the LF transmitter 12. In response to the ID request signal, the electronic key 20 transmits a response signal that includes an ID code. Based on the ID code in the response signal received from the electronic key 20, the controller 11 determines whether or not the electronic key 20 communicating with the controller 11 is authentic. For example, the controller 11 checks whether or not the ID code received from the electronic key 20 conforms to a valid ID code in the memory 11a.

When the controller 11 receives a touch signal from the door handle sensor 15 after determining that the electronic key 20 is authentic, the controller 11 activates the door lock device 14 to lock or unlock the vehicle door.

When a wireless signal received from the authentic electronic key 20 includes a vehicle door lock command, the controller 11 locks the vehicle door. When the wireless signal includes a vehicle door unlock command, the controller 11 unlocks the vehicle door.

As shown in FIG. 1, the electronic key 20 includes an electronic key control unit 21. An LF receiver 22, which receives wireless signals on the LF band, and an UHF transmitter 23, which transmits wireless signals on the UHF band, are electrically connected to the electronic key control unit 21.

When receiving an ID request signal from the vehicle 10, the LF receiver 22 demodulates the ID request signal to a pulse signal. Then, the LF receiver 22 provides the demodulated signal to the electronic key control unit 21.

The electronic key control unit 21 includes a non-volatile memory 21a, which stores an ID code unique to the electronic key 20. In response to the demodulation signal (ID request signal) from the receiver 22, the electronic key control unit 21 generates a response signal, which includes the ID code in the memory 21a, and provides the response signal to the UHF transmitter 23. The UHF transmitter 23 modulates the response signal and transmits the modulated signal as a wireless signal on the UHF band.

The electronic key 20 further includes a lock switch 24 and an unlock switch 25. When operated, the switches 24 and 25 provide an electric signal to the electronic key control unit 21.

When receiving an electric signal from the lock switch 24 or the unlock switch 25, the electronic key control unit 21 generates a command signal including the ID code stored in the memory 21a and a command corresponding to the received electric signal (i.e., door lock command or door unlock command). Then, the electronic key control unit 21 provides the command signal to the UHF transmitter 23. The UHF transmitter 23 modulates the command signal and transmits the modulated command signal as a wireless signal on the UHF band.

When the lock switch 24 and the unlock switch 25 are simultaneously operated, the electronic key control unit 21 generates an ID signal including only the ID code that is stored in the memory 21a. Then, the electronic key control unit 21 provides the ID signal to the UHF transmitter 23. The UHF transmitter 23 modulates the ID signal and transmits the modulated ID signal as a wireless signal on the UHF band.

A registration process executed by the controller 11 will now be described.

Figure 3A:
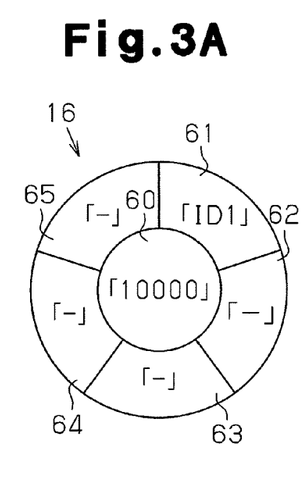
FIGS. 3A, 3B and 3C are diagrams illustrating an ID code adding mode.

Under the situation shown in FIG. 3A, ID code ID1 is stored in the first ID code storage region 61 of the memory 11a, and no ID codes are stored in the second to fifth ID code storage regions 62 to 65. Further, management data 10000 is stored in the management data storage region 60. Here, the user may lock and unlock the vehicle door only when using an electronic key 20 that has ID code ID1.

Figure 3B:
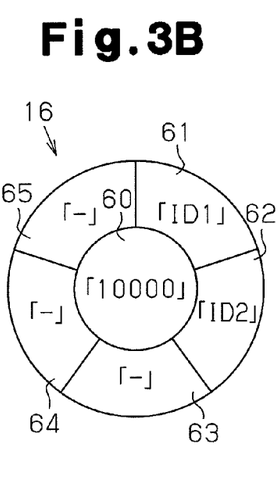
Figure 3C:
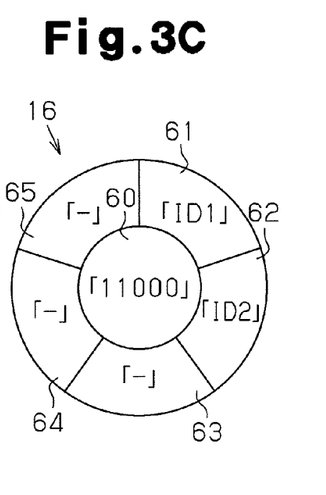

With reference to FIGS. 3A to 3C, a process executed by the controller 11 in the ID code adding mode to additionally register a non-registered ID code ID2 will now be described. When the processor 11b receives a wireless signal including the non-registered ID code ID2 from a new electronic key 20, the processor 11b writes ID code ID2 to the second ID code storage region 62 (FIG. 3B). After the ID code writing is completed, the processor 11b rewrites or updates the management data in the management data storage region 60 from 10000 to 11000 (FIG. 3C). When the updating of the management data is completed, the registration of ID code ID2 is completed. After the registration is completed, the user may lock and unlock the vehicle door only when using an electronic key 20 having one of the ID codes ID1 and ID2.

Figure 4A:
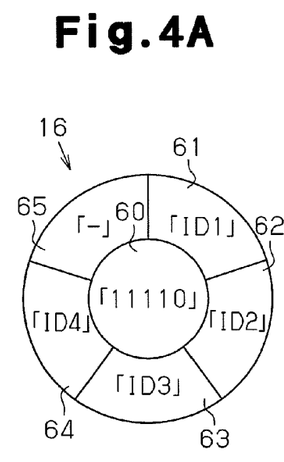
FIGS. 4A, 4B and 4C are diagrams illustrating the ID code adding mode.

With reference to FIGS. 4A to 4C, a process executed by the controller 11 in the ID code adding mode to additionally register a non-registered ID code ID5 of a new electronic key 20 will now be described. In this case, the registered ID codes in the memory 11a have already reached the maximum number (four in this example). As shown in FIG. 4A, ID codes ID1, ID2, ID3, and ID4 are stored in the first to fourth ID code storage regions 61 to 64, respectively. An ID code is not stored in the fifth ID code storage region 65. Further, management data 11110 is stored in the management data storage region 60. Here, the user may lock and unlock the vehicle door only when using an electronic key 20 that has one of the ID codes ID1 to ID4.

Figure 4B:
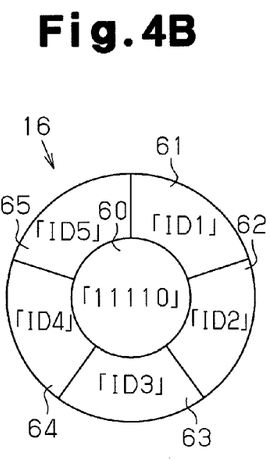
Figure 4C:
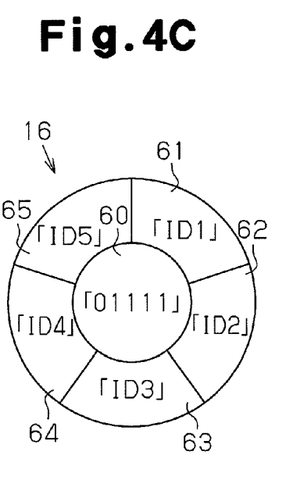

When the processor 11b receives a wireless signal including the non-registered ID code ID5 from a new electronic key 20, the processor 11b writes ID code ID5 to the vacant fifth ID code storage region 65 (FIG. 4B). Then, the processor 11b rewrites the management data in the management data storage region 60 from 11110 to 01111 (FIG. 3C). When the updating of the management data is completed, the registration of ID code ID5 is completed. After the registration is completed, the user may lock and unlock the vehicle door only when using an electronic key 20 having one of the ID codes ID2 to ID5.

The processor 11b may write a time stamp to the memory 11a. The time stamp indicates the point of time when an ID code is written to an ID code storage region. In this case, the registered ID codes in the memory 11a have reached the maximum number (four in this example). Thus, the processor 11b refers to the time stamp to update the management data by invalidating the ID code storage region storing the oldest one of the ID codes registered in the memory 11a. In the illustrated example, the oldest ID code is in the first ID code storage region 61. Thus, among the first to fifth ID code storage regions 61 to 65, at least the first ID code storage region 61 is invalidated.

Figure 5A:
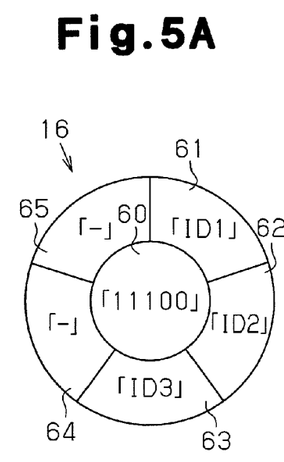
FIGS. 5A, 5B and 5C are diagrams illustrating an ID code rewriting mode.

The ID code rewriting mode will now be described with reference to FIGS. 5A to 5C. As shown in FIG. 5A, ID codes ID1, ID2, and ID3 are stored in the first to third ID code storage regions 61 to 63, respectively. ID codes are not stored in the fourth and fifth ID code storage regions 64 and 65. Management data 11100 is stored in the management data storage region 60. Under this situation, the user can lock and unlock the vehicle door only when using an electronic key having one of the ID codes ID1 to ID3.

Figure 5B:
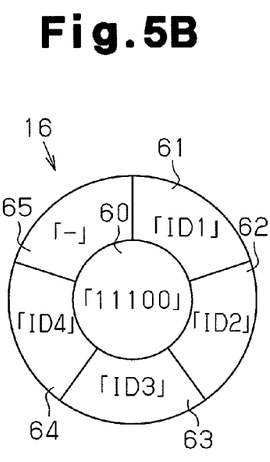
Figure 5C:
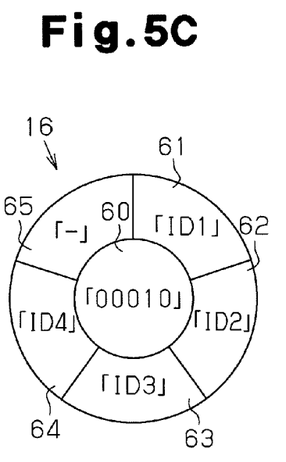

When the processor 11b receives a wireless signal including a non-registered ID code ID4 from a new electronic key 20, the processor 11b writes ID code ID4 to the fourth ID code storage region 64 (FIG. 5B). Then, the processor 11b rewrites the management data in the management data storage region 60 from 11100 to 00010 (FIG. 5C). When the updating of the management data is completed, the existing ID codes ID1 to ID3 are disabled and the newly written ID code ID4 is validated. After the rewriting of ID code ID4 is completed, the user may lock and unlock the vehicle door only when using an electronic key 20 having ID code ID4.

Figure 6A:
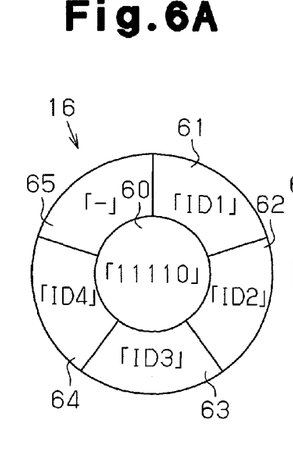
FIGS. 6A, 6B and 6C are diagrams illustrating the ID code rewriting mode.

The management data rewriting mode will now be described with reference to FIGS. 6A and 6B. As shown in FIG. 6A, ID codes ID1 to ID4 are stored in the first to fourth ID code storage regions 61 to 64, respectively. An ID code is not stored in the fifth ID code storage region 65. Management data 11110 is stored in the management data storage region 60. Under this situation, the user can lock and unlock the vehicle door only when using an electronic key having one of the ID codes ID1 to ID4.

Figure 6B:
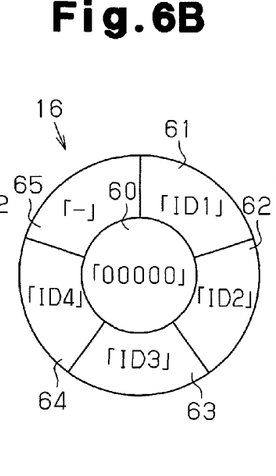

In the management data rewriting mode, when the processor 11b receives, for example, management data 00000, as shown in FIG. 6B, the processor 11b rewrites the management data stored in the management data storage region 60 from 11110 to 00000. When the updating of the management data is completed, the controller 11 completes the processing of the management data rewriting mode. When the first data region 16 is in the storage state shown in FIG. 6B, the user cannot lock and unlock the vehicle door with an electronic key 20 having any one of the ID codes ID1 to ID4.

Figure 6C:
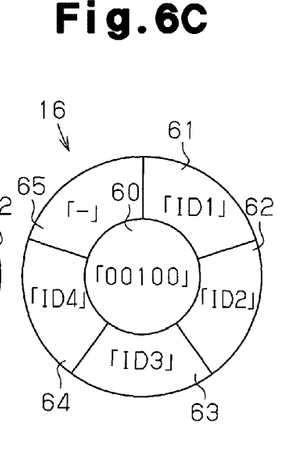

With reference to FIGS. 6A to 6C, a further example of a management data rewriting mode will now be described. When the first data region 16 is in the storage state shown in FIG. 6B and the controller 11 receives, for example, management data 00100 from the external tool 30 in the management data rewriting mode, the processor 11b rewrites the management data of the management data storage region 60 from 11110 to 00100 (FIG. 6C). When the updating of the management data is completed, the controller 11 completes the processing of the management data rewriting mode. When the first data region 16 is in the storage state shown in FIG. 6C, the user may lock and unlock the vehicle door only when using an electronic key 20 having ID code ID3.

Figure 7A:
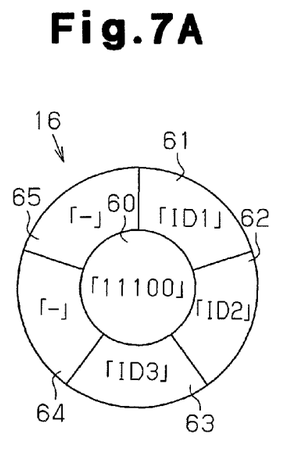
FIGS. 7A and 7B are schematic diagrams illustrating the memory state of the first to third data regions when a momentary power outage occurs during the registration of an ID code.

The storage state of the first data region 16 when a momentary outage occurs in the power supplied from the battery while the processor 11b is writing an ID code to the ID code storage region during the ID code adding mode or the ID code rewriting mode will now be described with reference to FIGS. 7A and 7B. As shown in FIG. 7A, the ID codes ID1 to ID3 are stored in the first to third ID code regions 61 to 63, respectively. ID codes are not stored in the fourth and fifth ID code regions 64 and 65. Management data 11100 is stored in the management data storage region 60.

Figure 7B:
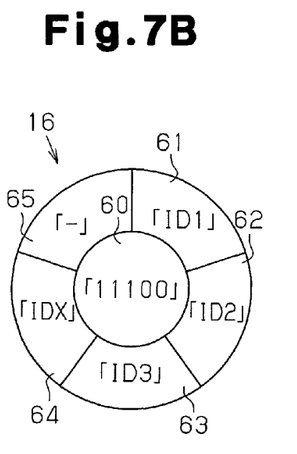

Referring to FIG. 7B, when the processor 11b receives a wireless signal including a non-registered ID code ID4 from a new electronic key 20, the processor 11b writes ID code ID4 to the fourth ID code storage region 64. When a momentary power outage occurs while writing ID code ID4 to the fourth ID code storage region 64, the writing is interrupted. Accordingly, ID code ID4 is incorrectly or incompletely written. Thus, an incorrect or incomplete ID code IDX is written to the fourth ID code region 64. Since the ID code writing is incomplete, the management data is not updated. Accordingly, the management data stored in the management data storage region 60 is 11100 and remains unchanged. In this case, although the ID code registration has been interrupted, the ID codes ID1 to ID3 remain in the first to third ID code storage regions 61 to 63. Thus, the user may lock and unlock the vehicle door by using an electronic key 20 having one of the ID codes ID1 to ID3. In this manner, the registration state before the starting of the registration process is held.

The first embodiment has the advantages described below.

(1) The memory 11a of the controller 11 includes the ID code storage regions 61 to 65 and the management data storage region 60. The number of the ID code storage regions 61 to 65 is greater by one than the maximum number (four in this example) of electronic keys that can be registered. The management data storage region 60 stores management data that indicates whether each of the first to fifth ID code storage regions 61 to 65 is valid or invalid. The processor 11b of the controller 11 writes a non-registered ID code to an invalid ID code storage region. Then, the processor 11b rewrites the management data in the management data storage region 60 so that the invalid storage region to which the ID code is written becomes valid. This registers the non-registered ID code. When an ID code is stored in all of the ID code storage regions 61 to 65 after the non-registered ID code is written, the processor 11b rewrites the management data of the management data storage region 60 to invalidate at least one ID code storage region (e.g., storage region storing the oldest ID code) excluding the ID code storage region that was invalid and stored the non-registered ID code. Accordingly, at least one ID code storage region is constantly kept invalid or vacant. Thus, even when a momentary outage occurs in the power supplied to the controller 11 during the writing of an ID code, the ID codes stored in storage regions that were valid prior to the registration process remain stored in the memory 11a. Thus, as long as a momentary power outage occurs before the management data is rewritten, the registration state prior to when the registration process started is held. This avoids a situation in which a correct ID code is erased.

(2) The operation modes of the controller 11 include the ID code rewriting mode. In the ID code rewriting mode, the processor 11b writes a new or non-registered ID code to an invalid ID code storage region. Then, the management data of the management data storage region 60 is automatically written to validate the ID code storage region to which the new or non-registered ID code has been written and simultaneously invalidate every one of the ID code storage regions excluding the ID code storage region to which the new or non-registered ID code has been written. Accordingly, the ID code rewriting mode registers a new ID code and simultaneously invalidates all of the ID code storage regions storing unnecessary ID codes. This eliminates the need for the user to manually invalidate or delete unnecessary ID codes.

(3) The controller 11 is operable in the management data rewriting mode. In the management data rewriting mode, the processor rewrites only the management data in the management data storage region 60 in accordance with a signal from the external tool 30. For example, the processor 11b may rewrite the management data to 00000 to simultaneously invalidate all of the storage regions. Further, when an ID code is stored in a code storage region but invalidated by the management data, the ID code may be validated by rewriting new management data. This eliminates the need to write a new ID code.

A second embodiment of a registration device will now be described focusing on differences from the first embodiment. The second embodiment differs from the first embodiment in that the memory 11a includes a plurality of data regions. Like or same reference numerals are given to those components that are the same as the corresponding components of the first embodiment. Such components will not be described.

As shown in FIG. 1, the memory 11a of the controller 11 includes second and third data regions 17 and 18 in addition to the first data region 16. As shown in FIG. 2, the second data region 17 includes first to fifth ID code storage regions 71, 72, 73, 74, and 75 and a management data storage region 70. The third data region 18 includes first to fifth ID code storage regions 81, 82, 83, 84, and 85 and a management data storage region 80. The first to fifth ID code storage regions 71 to 75 of the second data region 17 and the first to fifth ID code storage regions 81 to 85 of the third data region 18 store the same ID codes as those stored in the first to fifth ID code storage regions 61 to 65 of the first data region 16.

The management data storage region 70 of the second data region 17 and the management data storage region 80 of the third data region 18 store the same management data as that stored in management data storage region 60 of the first data region 16.

The ID code adding mode and the ID code rewriting mode will now be described.

When the controller 11 receives a non-registered ID code, the processor 11b of the controller 11 writes the non-registered ID code to the first to third data regions 16 to 18 in a predetermined order. The non-registered ID code is written to corresponding ID code storage regions in the first to third data regions 16 to 18. For example, when the processor 11b writes the non-registered ID code to the second ID code storage region 62 of the first data region 16, the processor 11b writes the same ID code to the second ID code storage regions 72 and 82 of the second and third data regions 17 and 18.

After the processor 11b completes writing the ID code to one data region, the processor rewrites the management data for that data region. Accordingly, the management data in the management data storage regions 60, 70, and 80 of the first to third data regions 16, 17, and 18 are rewritten in this order. When the updating of the management data in the management data storage regions 60, 70, and 80 is completed, the registration of the ID codes is completed.

In the management data rewriting mode, when new management data is input, the processor 11b rewrites the management data in a predetermined order to the management data storage regions 60, 70, and 80 in accordance with the procedures described in relation with the ID code adding mode and the ID code rewriting mode. When the updating of the management data in the management data storage regions 60, 70, and 80 is completed, the processing of the management data rewriting mode is completed.

The storage state of the first to third data regions 16 to 18 when a momentary outage occurs in the power supplied from the battery 19 while the processor 11b is writing management data to the management data storage regions will now be described. In the description hereafter, the controller 11 is in the ID code adding mode, and the processor 11b has completed writing the non-registered ID code ID3 to the first to third data regions 16 to 18 of the memory 11a. More specifically, referring to FIGS. 8A, 8B, and 8C, ID code ID1 is stored in each of the first ID code storage regions 61, 71, and 81. ID code ID2 is stored in each of the second ID code storage regions 62, 72, and 82. ID code ID3 is stored in each of the third ID code storage regions 63, 73, and 83. ID codes are not stored in the fourth and fifth ID code storage regions 64, 65, 74, 75, 84, and 85. Management data 11000 is stored in each of the management data storage regions 60, 70, and 80.

Figure 8A:
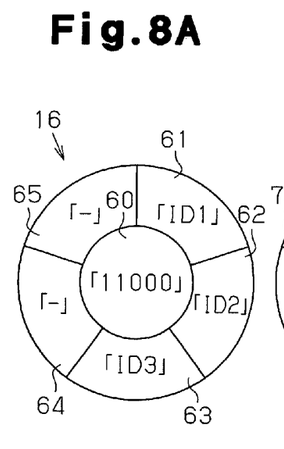
FIGS. 8A, 8B, and 8C are schematic diagrams illustrating an ID code adding mode in a second embodiment.
Figure 8B:
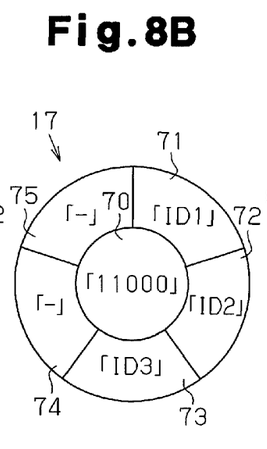
Figure 8C:
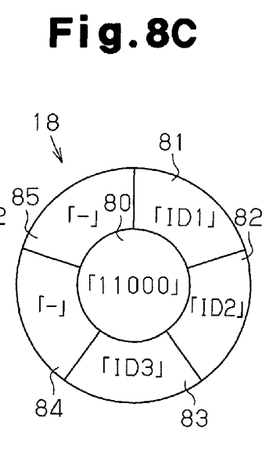
Figure 9A:
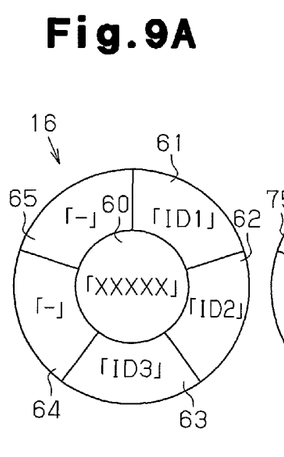
FIGS. 9A, 9B, and 9C are diagrams illustrating the memory state of the first to third data regions when a momentary power outage occurs while rewriting management data of the second data region.
Figure 9B:
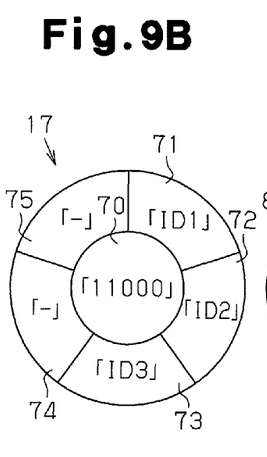
Figure 9C:
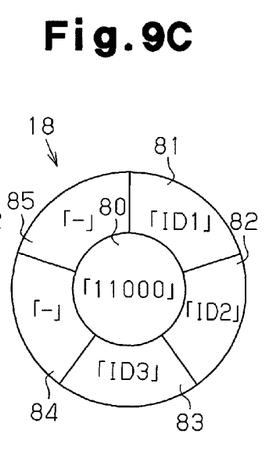

Referring to FIGS. 8A to 8C, when completing the writing of ID code ID3 to the third ID code storage regions 63, 73, and 83, the processor 11b rewrites the management data in the management data storage region 60 from 11000 to 11100. When a momentary power outage occurs during the rewriting, the power outage interrupts the writing of management data 11100 to the management data storage region 60. Thus, management data 11100 is incorrectly or incompletely written to the management data storage region 60. Such management data is written as XXXXX. However, as shown in FIGS. 9B and 9C, the management data in the management data storage regions 70 and 80 is 11000 and remains the same as prior to the momentary power outage. The processor 11b determines that management data 11000 is the correct management data since this management data is identical in two of the three management data storage regions 60 to 80. The ID codes corresponding to the ID code storage regions indicated as being valid in the correct management data is subsequently used to verify the ID code of an electronic key 20. In the illustrated example, the user may lock and unlock a vehicle door using an electronic key 20 having ID code ID1 or ID2. In this manner, the registration state prior to the registration process is held.

A case in which a momentary power outage occurs while writing the management data to the management data storage region 70 will now be described.

Figure 10A:
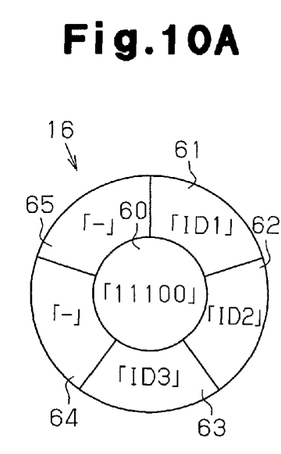
FIGS. 10A, 10B, and 10C are diagrams illustrating the memory state of the first to third data regions when a momentary power outage occurs while rewriting management data of the second data region.
Figure 10B:
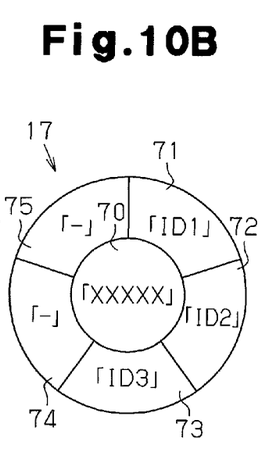
Figure 10C:
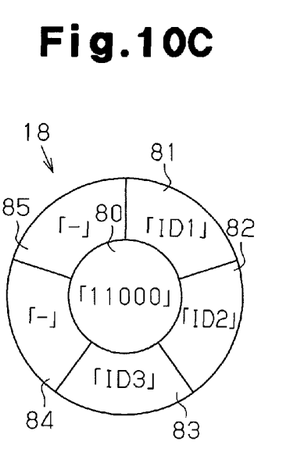

Referring to FIGS. 8A to 8C, the ID code ID3 is correctly written to the third ID code storage regions 63, 73, and 83. Then, referring to FIG. 10A, the management data in the management data storage region 60 is correctly rewritten from 11000 to 11100. Then, the processor 11b starts to rewrite the management data in the management data storage region 70 from 11000 to 11100. The occurrence of a momentary power outage when the management data is being written to the management data storage region 70 interrupts the writing of management data 11100 to the management data storage region 70. Thus, management data 11100 is incorrectly or incompletely written to the management data storage region 70, and incorrect or incomplete management data XXXXX is written (FIG. 10B). However, as shown in FIG. 10A, the new management data of 11100 is stored in the management data storage region 60 as shown in FIG. 10A, and management data 11000 from prior to when the registration started is stored in the management data storage region 80 as shown in FIG. 10C. Among the three stored sets of management data, the processor determines that management data 11000, which is the same as prior to when the registration started, is the correct data. The management data determined as being correct is subsequently used to verify the ID code of an electronic key 20 with the ID code corresponding to the ID code storage region indicated as being valid by the correct management data. In the example of FIG. 10, the user may lock and unlock a vehicle door using an electronic key 20 having ID code ID1 or ID2. In this manner, the registration state prior to the registration process is held.

A case in which a momentary power outage occurs while writing the management data to the management data storage region 80 will now be described.

Figure 11A:
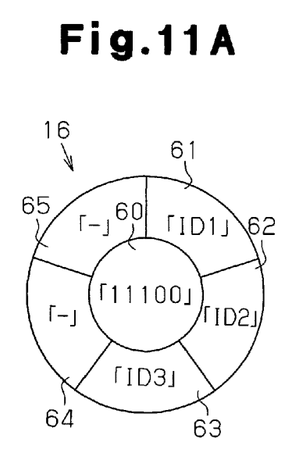
FIGS. 11A, 11B, and 11C are diagrams illustrating the memory state of the first to third data regions when a momentary power outage occurs while rewriting management data of the third data region.
Figure 11B:
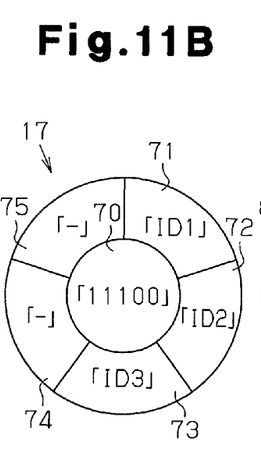
Figure 11C:
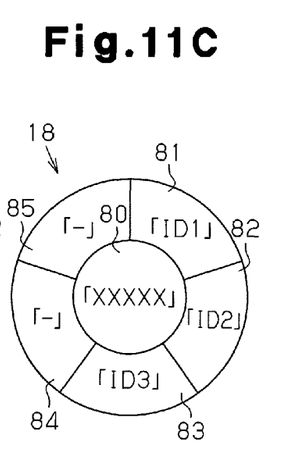

Referring to FIGS. 8A to 8C, the ID code ID3 is correctly written to the third ID code storage regions 63, 73, and 83. Then, referring to FIGS. 11A and 11B, each set of management data in the management data storage regions 60 and 70 is correctly rewritten from 11000 to 11100. Then, the processor 11b starts to rewrite the management data in the management data storage region 80 from 11000 to 11100. The occurrence of a momentary power outage when the management data is being written to the management data storage region 80 interrupts the writing of management data 11100 to the management data storage region 80. Thus, management data 11100 is incorrectly or incompletely written to the management data storage region 80, and incorrect or incomplete management data XXXXX is written (FIG. 11C). In this case, among the three stored sets of management data, the processor determines that the two identical sets of management data 11100 is the correct data. The management data determined as being correct is subsequently used to verify the ID code of an electronic key 20 with the ID code corresponding to the ID code storage region indicated as being valid by the correct management data. In the illustrated example, the user may lock and unlock a vehicle door using an electronic key 20 having any one of ID codes ID1 to ID3.

The second embodiment has been described in relation with the ID code adding mode. However, the procedures for rewriting the management data are the same for the ID code rewriting mode and the management data rewriting mode. Accordingly, the controller stores the ID code and the management data in each of the three data regions 16, 17, and 18. Thus, even when a momentary power outage interrupts the writing of the management data, the old ID codes prior to the starting of the registration process (refer to FIGS. 8 and 9) and the new ID codes that have undergone a normal registration process (refer to FIG. 10) are protected.

The second embodiment has the advantages described below.

(4) The memory 11a includes the three data regions 16, 17, and 18. Each of the data regions 16 to 18 includes an n+1 number of ID code storage regions and one management data storage region. When a non-registered ID code is input, the processor 11b writes the input ID codes in a predetermined order to the first data regions 16 to 18. Whenever, the writing of an ID code to each data region is completed, the management data of the data region is updated. Accordingly, the management data of the data regions 16 to 18 are updated sequentially, that is, at different times. Thus, even when a momentary power outage occurs for one reason or another while writing management data to a data region, although the correct management data and the correct ID codes cannot be maintained in that data region, the correct management data and correct ID codes are kept stored in the other data regions. Accordingly, the old data prior to the starting of the registration process and the new data that have undergone a normal registration process are protected.

(5) When only the management data is input, the processor 11b registers the management data to the data regions 16 to 18 in a predetermined order. Thus, even when a momentary outage occurs in the power supplied to the controller 11 for one reason or another while writing management data, the old data prior to the starting of the registration process and the new data that have undergone the registration process are protected. This avoids a situation in which a correct ID code is erased.

It should be apparent to those skilled in the art that the present invention may be embodied in many other specific forms without departing from the spirit or scope of the invention. Particularly, it should be understood that the present invention may be embodied in the following forms.

In the second embodiment, the memory 11a may include any number of data regions. When the memory 11a includes a plurality of data regions, advantage (4) of the second embodiment may be obtained.

The ID code rewriting mode and the management data rewriting mode may be omitted. In such a case, advantage (1) of the first embodiment and advantage (4) of the second embodiment may still be obtained.

The ID code and the management data may be changed to any number of bits. The ID code is used to verify wireless signals from the electronic key 20. However, the management data is not used to verify wireless signals from the electronic key 20. Thus, in relation with the capacity of the memory 11a, it is desirable that the data volume of the management data be smaller than the ID code.

The management data does not have to be a binary bit string of n+1 bits and may be n+1 data pieces. In this case, it is preferable that the updating of management data be performed by rewriting only the data pieces that need to be rewritten.

The processor 11b switches modes in accordance with a switch signal provided from the external tool 30. However, modes may be switched through other ways. For example, the processor 11b may switch modes in accordance with a mode switch signal from a mode selection switch electrically connected to the controller 11. Alternatively, the processor 11b may switch modes in response to a wireless signal transmitted from the electronic key 20.

The number of ID code regions in each of the data regions 16, 17, and 18 may be changed. In this case, the number of bits in the management data is changed in accordance with the number of ID code storage regions.

In the first and second embodiments, the registration device registers the ID code of the electronic key 20 in the electronic key system. However, the registration device may register an ID code of an electronic device other than the electronic key 20.

The memory 11a and the processor 11b are arranged in the controller 11. However, as long as the processor 11b is capable of accessing the memory 11a, the memory 11a and the process 11b may be separated.

The present examples and embodiments are to be considered as illustrative and not restrictive, and the invention is not to be limited to the details given herein, but may be modified within the scope and equivalence of the appended claims.

The invention claimed is:

1. A registration device for registering ID codes, the registration device comprising:
three or more storages, each storage set to allow for registration of a maximum of an n number of ID codes, where n is a natural number of two or greater; and
a registration controller that registers ID codes to the storage;
wherein each of the three or more storages includes
an n+1 number of ID code storage regions configured to store n+1 ID codes, respectively, and
a management data storage region that stores management data indicating whether the ID code of each ID code storage region of the corresponding storage is valid or invalid; and
wherein the registration controller includes instructions configured to:
write an input ID code to the three or more storages in a sequential manner, wherein the input ID code is written to an invalid ID code storage region among the n+1 number of ID code storage regions of each of the storages in accordance with the management data of the corresponding storage without deleting the ID code of each ID code storage region to maintain the ID code of each ID code storage region,
update the management data of the three or more storages in a sequential manner after the input ID code is written to the three or more storages to validate the invalid ID code storage region of each of the storages,
update the management data, when an ID code is stored in each of the n+1 number of ID code storage regions after the input ID code is written, to invalidate at least one ID code storage region excluding the invalid ID code storage region to which the input ID code has been written, and
compare the management data of the three or more storages to determine whether the management data of the three or more storages include two or more management data that are identical to one another and, when the management data of the three or more storages include two or more management data that are identical to one another, determine that said two or more management data that are identical to one another are correct and the remainder of the management data are incorrect, and use the ID codes in accordance with said two or more management data that are identical to one another among the management data of the three or more storages,
wherein the management data has n+1 bits corresponding to the n+1 ID code storage regions, respectively, and the management data indicates a maximum of an n number of valid ID codes, and
wherein, before completing the updating the management data in the management data storage region, the registration controller is configured not to perform operations to the ID code storage regions storing ID codes other than the last input ID code.

2. The registration device according to claim 1, wherein the registration controller further includes instructions configured to update only the management data in the management data storage region of the storage when management data is input.

3. The registration device according to claim 1, wherein the registration controller further includes instructions configured to update the management data, after the input ID code is written, to validate only the invalid ID code storage region to which the input ID code has been written and simultaneously invalidate every one of the ID code storage regions excluding the invalid ID code storage region to which the input ID code has been written.

4. The registration device according to claim 1, wherein the storage includes a plurality of data regions, each of the data regions includes the n+1 number of ID code storage regions and the management data storage region, and
the registration controller further includes instructions configured to:
write a non-registered ID code to the data regions in a predetermined order, and
update the management data of each data region whenever the writing of the non-registered ID code to the data region is completed.

5. The registration device according to claim 4, wherein the registration controller further includes instructions configured to register, when new management data is input, the new management data to the data regions in a predetermined order.

6. The registration device according to claim 1, wherein the management data indicates that one or more of the n+1 ID code storage regions is constantly invalid.

7. An ID code registration device, comprising:
three or more storages; and
a registration controller capable of accessing the storage;
wherein each of the three or more storages includes
an n+1 number of ID code storage regions configured to store n+1 ID codes, respectively,
a management data storage region that stores management data having n+1 bits corresponding to the n+1 ID code storage regions, respectively, wherein each bit of the management data indicates whether the corresponding ID code storage region is valid or invalid, the management data indicates a maximum of an n number of valid ID codes, and at least one bit of the management data constantly indicates an invalid condition, where n is a natural number of two or greater, wherein the registration controller includes instructions configured to:

write an input ID code to the three or more storages in a sequential manner, wherein the input ID code is written to an invalid ID code storage region corresponding to a bit of the management data indicating an invalid condition without deleting the ID code of each ID code storage region to maintain the ID code of each ID code storage region, rewrite, after the input ID code is written to the three or more storages, the bit of the management data corresponding to the invalid ID code storage region to which the input ID code is written to indicate a valid state, wherein, before completing the rewriting, the registration controller is configured not to perform operations to the ID code storage regions storing ID codes other than the last input ID code, and when only one bit of the management data indicates an invalid condition at a point of time immediately before the input ID code is written, write the input ID code to the invalid ID code storage region corresponding to the bit of the management data that indicates an invalid condition, and then validate the bit of the management data that indicates an invalid condition and simultaneously invalidate the other bits of the management data excluding the bit of the management data that indicates an invalid condition, and wherein the registration controller includes instructions configured to:

compare the management data of the three or more storages to determine whether the management data of the three or more storages include two or more management data that are identical to one another, when the management data of the three or more storages include two or more management data that are identical to one another, determine that said two or more management data that are identical to one another are correct and the remainder of the management data are incorrect, and use the ID codes stored in two or more storages that include said two or more management data that are identical to one another, in accordance with said two or more management data.

8. The ID code registration device according to claim 7, further comprising:

an input terminal connected to a wireless receiver that receives an ID code, wherein the registration controller further includes instructions configured to write the ID code received by the input terminal to an invalid code storage region corresponding to a bit of the management data indicating an invalid condition.

9. An electronic key system comprising:

an electronic key provided with an ID code; and the ID code registration device according to claim 7.

10. The registration device according to claim 1, wherein, in a period from writing the last input ID code to the invalid ID code storage region to completing the updating the management data in the management data storage region, the registration controller is configured not to perform data-writing, data-deleting, and data-moving operations to the ID code storage regions that have stored therein the respective ID codes other than the last input ID code.

11. The ID code registration device according to claim 7, wherein, in a period from writing the last input ID code to the invalid ID code storage region to completing the rewriting, the registration controller is configured not to perform data-writing, data-deleting, and data-moving operations to the ID code storage regions that have stored therein the respective ID codes other than the last input ID code.

12. A registration device for registering ID codes, the registration device comprising:

three or more storages, each set to allow for registration of a maximum of an n number of ID codes, where n is a natural number of two or greater; and a registration controller that registers ID codes to the storages;

wherein each of the three or more storages includes an n+1 number of ID code storage regions configured to store n+1 ID codes, respectively, and a management data storage region that stores management data indicating whether the ID code of each ID code storage region of the corresponding storage is valid or invalid; and wherein the registration controller includes instructions configured to:

write an input ID code to the three or more storages in a sequential manner, update the management data of the three or more storages in a sequential manner after the input ID code is written to the three or more storages, and compare the management data of the three or more storages to determine whether the management data of the three or more storages include two or more management data that are identical to one another and, when the management data of the three or more storages include two or more management data that are identical to one another, determine that said two or more management data that are identical to one another are correct and the remainder of the management data are incorrect, and selectively use the ID codes in accordance with said two or more management data that are identical to one another among the management data of the three or more storages.

* * * * *